United States Patent [19]
Hölzl et al.

[11] Patent Number: 5,671,682
[45] Date of Patent: Sep. 30, 1997

[54] SWAY BRACE WITH SPRUNG SUPPORT AND SUPPLEMENTARY AND EMERGENCY SPRING

[75] Inventors: Stefan Hölzl, Munich; Roland Philipp, Berlin; Peter Reichert, Berlin; Klaus-Henning Babnik, Berlin, all of Germany

[73] Assignee: Knorr Bremse AG, Munich, Germany

[21] Appl. No.: 537,099

[22] PCT Filed: Dec. 17, 1993

[86] PCT No.: PCT/DE93/01226

§ 371 Date: Sep. 29, 1995

§ 102(e) Date: Sep. 29, 1995

[87] PCT Pub. No.: WO94/22702

PCT Pub. Date: Oct. 13, 1994

[30] Foreign Application Priority Data

Mar. 30, 1993 [DE] Germany .......................... 93 04 837 U

[51] Int. Cl.$^6$ ............................................... B61F 3/00
[52] U.S. Cl. ............................ 105/199.2; 105/199.1; 105/199.3
[58] Field of Search .................. 105/199.1–199.3; 280/111, 688, 702, 709, 710; 267/34, 113, 120, 124, 161, 162, 256

[56] References Cited

U.S. PATENT DOCUMENTS

| | | | |
|---|---|---|---|
| 3,817,186 | 6/1974 | Walsh | 105/199.2 |
| 4,324,187 | 4/1982 | Sambo | 105/199.2 |
| 4,456,233 | 6/1984 | Muller | 267/162 |

FOREIGN PATENT DOCUMENTS

| | | |
|---|---|---|
| 1118460 | 6/1956 | France . |
| 810 333 | 8/1951 | Germany . |
| 833 745 | 3/1952 | Germany . |
| 1083299 | 6/1960 | Germany . |
| 1094786 | 12/1960 | Germany . |
| 863743 | 3/1961 | United Kingdom . |

*Primary Examiner*—Robert J. Oberleitner
*Assistant Examiner*—C. T. Bartz
*Attorney, Agent, or Firm*—Barnes & Thornburg

[57] ABSTRACT

The invention relates to a sway brace on rail vehicles. The aim of the invention is to find a solution in which the effort and expense needed to produce the sprung sway braces can be reduced and the transverse forces and the resultant wear occurring on deflection can be reduced to the minimum. This is achieved by the invention in that one end of the sprung sway braces in a special design is arranged in a support with defined guide surfaces while the other end is secured to the piston of a hydraulic cylinder via an axial rocker beating. In addition, there is a disc spring column above the sway brace.

3 Claims, 2 Drawing Sheets

SWAY BRACE WITH SPRUNG SUPPORT AND SUPPLEMENTARY AND EMERGENCY SPRING

BACKGROUND AND SUMMARY OF THE INVENTION

The invention relates to a sway brace on rail vehicles. Sway braces are used for the parallel displacement of components on rail vehicles. These sway braces consist of oblong bodies whose ends have curved surfaces or Spherical surfaces and which are usually supported on plane pressure surfaces. For preventing a lateral displacement of the sway braces, guides are used whose one surface is formed by a cycloidal curve and whose other surface is formed by a circular cylinder.

Sway braces are known which the support is not rigid but is formed by two sleeves which can be telescoped into one another, a coil spring transmitting the supporting force from one part of the support to the other. Examples are shown in German Patent Documents DE 810 333 and 833 745.

The sway braces may be designed such that restoring forces occur which always lead the superstructure back into the center position. The extent of the restoring forces can be varied so that a side sway frequency can be achieved which is advantageous for the movement of the vehicle.

In order to avoid an excessive rolling angle during fast cornering or in order to prevent the unloading of wheels in the case of a suspension failure, supplementary springs are required which will start to operate after a defined spring travel of the main spring and render the overall suspension stiffer or, in the case of a failure of the main suspension, take over the suspension of the superstructure alone.

The known solutions have the disadvantage that the cycloidal curve for the one lateral guide surface is expensive to manufacture and that, in the case of resilient sway braces, additional guiding elements for absorbing transverse forces are required which are susceptible to wear and must therefore be lubricated. In addition, the lateral guide surfaces also must absorb certain transverse forces if, because of the telescope-type guiding, the two spherical caps no longer have the same center point as soon as the brace sways out of the center position.

Supplementary springs are known which are arranged in the main spring, such as the pneumatic spring, or around or next to the main spring.

These supplementary springs have the disadvantage that, when they are operative, they considerably hinder the side swaying of the superstructure and therefore impair the running quality in the horizontally transverse direction.

It is an object of the invention to provide a solution in which the expenditures required for manufacturing the resilient sway brace are lowered, the transverse forces occurring on deflection and the corresponding wear are reduced to a minimum and in which the supplementary spring, even after it has become operative, has no influence on the side swaying of the superstructure.

According to the invention, this object is achieved in that one end of the resilient sway brace which has a special design is arranged in a support with defined guide surfaces, while the other end, by way of an axial rocker bearing, is fastened to the piston of a hydraulic cylinder. Above the piston of a sway brace with a sprung support, a supplementary spring, expediently a disk spring column, is arranged against which the piston runs after travelling along a defined path of the sprung support, whereby the vertical spring rate of the superstructure suspension is increased and an excessive rolling angle is avoided, or against which the piston presses in the case of a pressure loss in the cylinder as a result of, for example, a line break so that the supplementary spring acts as an emergency spring. In both cases, the force resulting from the superstructure mass is introduced into the sway brace by way of the joint in the piston of the sway brace, whereby the side sway of the superstructure remains unaffected.

In the following, the invention will be explained by means of an embodiment.

DETAILED DESCRIPTION OF THE PREFERRED EMBODIMENTS

Figure 1:
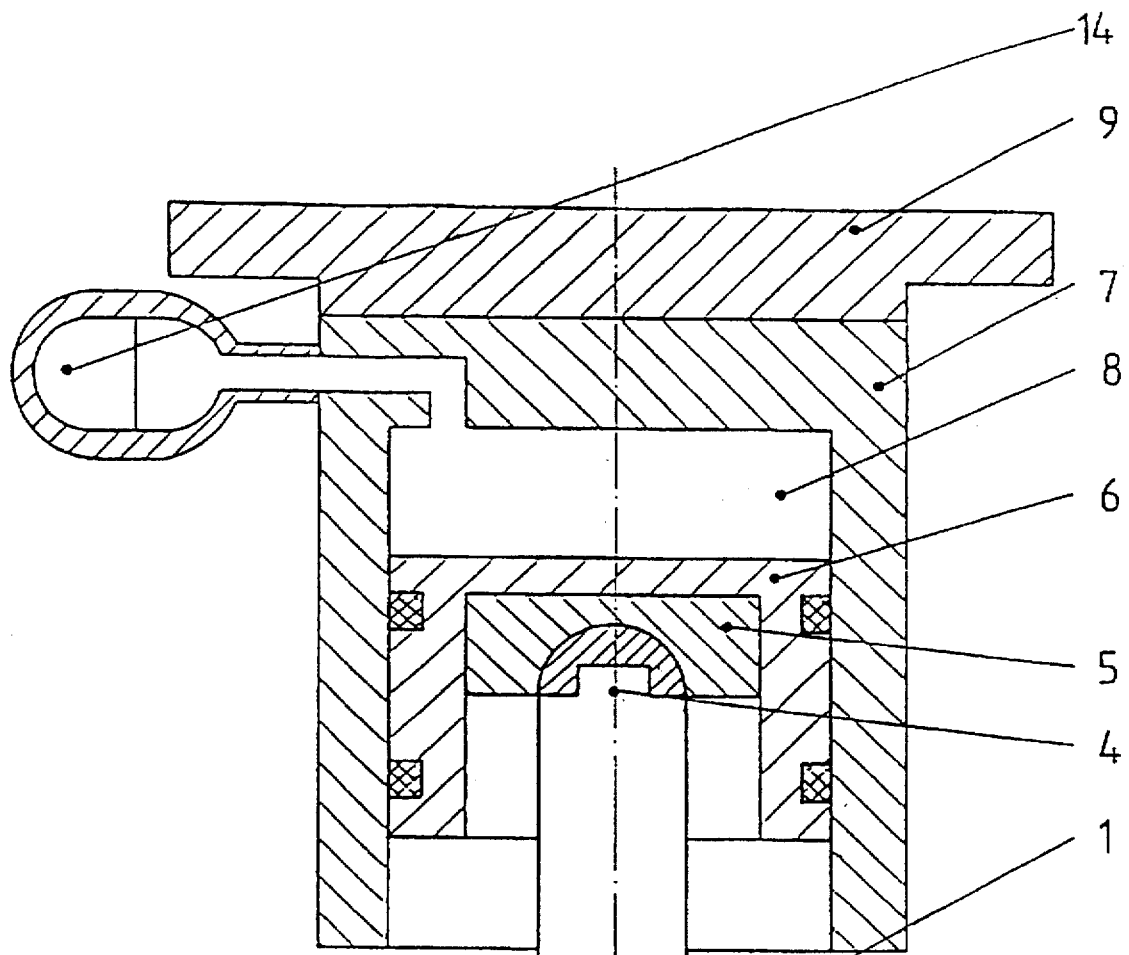
FIG. 1 is a cross sectional representation of the solution according to the invention.

The following arrangement is obtained:

On the upper component 9 of the rail vehicle as shown in FIG. 1 a cylinder 7 is fastened in which a piston 6 is guided which forms a piston space 8 which is connected with a pressure accumulator 14 and in which pressurized oil is situated.

By way of a joint 5, the end 4 of the brace 1 of the sway brace is fastened on the piston 6.

The other end 2 of the brace 1 has an end face 15 which, having a spherical design, is supported on the surface 11 of the component 10 fastened on the lower component 3. The lateral surface 12 of end 2, which is generated by circular segments with different radii whose entering points are situated on the surface 11 when the brace 1 is in the center position, can still be supported in a perfect manner without any jamming in the case of the deflection angles which occur in practice.

As an alternative, the surface 11 may also be designed to be spherical while the end face 15 of the end 2 of the brace 1 has a planar design; or the opposite surface 13 on the component 10 may be a rotation surface with two or more circular curves, while the lateral surface 12 is constructed as a straight circular-cylindrical surface.

Figure 2:
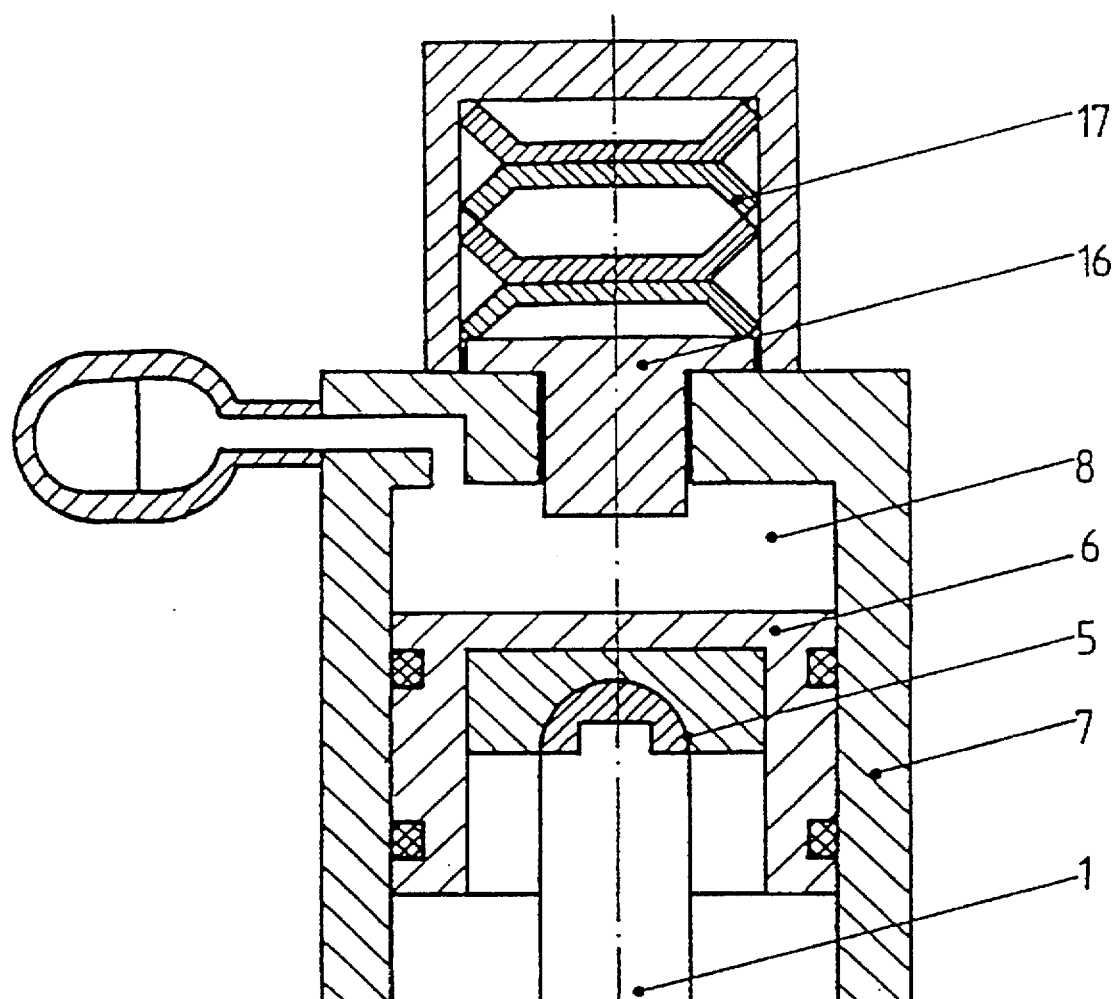
FIG. 2 is a cross sectional view of the solution according to the invention with the supplementary and emergency spring.

In a further development of the invention shown in FIG. 2, above the piston 6 of the brace 1 on the cylinder 7, a pin 16 is arranged which projects into the piston space 8 of the cylinder 7 and above which a disk spring column 17 is situated.

The following operation takes place:

In connection with the pressure accumulator 14, the hydraulic fluid situated in the piston space 8 acts as an elastic medium and therefore cushions the component 9 on which the cylinder is fastened with respect to the component 3. In this case, the supporting force is introduced by the piston 6 into the joint 5 and from this joint 5 into the brace 1 and thus into the component 3. In the case of transverse movements of the component 9, the brace 1 will sway and the end 2 of the brace 1 rolls along the surface 11, in which case the lateral surface 12 slides along the opposite surface 13 without jamming and thus prevents a lateral movement of the brace 1.

Since the radius of the end face 15, which has a spherical design, is larger than the distance of the joint 5 from the surface 11, a restoring moment occurs during transverse movements of the component 9 which, because of the constant distance of the joint 5 from the surface 11, independent of the spring travel of the component 9.

The disk spring column 17, is arranged above the piston 6 of the brace 1 with the sprung cylinder 7 and which is fitted on the bottom onto a pin 16, whose lower end projects into the piston space 8 and against which the piston presses after travelling along a defined path and which case the disk spring column 17 is compressed. As a result the force originating from the superstructure mass is introduced by the joint 5 in the piston 6 into the brace 1 which permits the side sway of the super structure which is unaffected by the action of the disk spring column 17.

We claim:

1. Sway brace with a sprung support and a supplementary spring, arranged on rail vehicles between first and second components, the sprung support being formed of a cylinder with a piston, whose piston space is connected with a pressure accumulator, and of a brace wherein a lower end of the brace is supported on a surface of the first component, at least one of the end face of the lower end of the brace and the surface being designed as a spherical surface, while an upper end of the brace is fastened by a joint to the piston, and a lateral surface of the lower end of the brace or an opposite surface on the first component is a rotation surface with two or more circular curves as a generatrix, while the respective other lateral surface or the opposite surface is constructed as a straight circular-cylindrical surface.

2. Sway brace according to claim 1, wherein the end face of the lower end of the brace is constructed as a spherical surface and the surface of the first component is constructed to be planar, and the lateral surface of the lower end of the brace is a rotation surface with two or three circular curves as a generatrix, whereas the opposite surface is constructed as a straight circular-cylindrical surface.

3. Sway brace according to claim 1, wherein the spring includes a disk spring column above the piston of the brace on the cylinder and the disk spring column is fitted on the bottom onto a pin whose lower end projects into the piston space of the cylinder.

* * * * *